(12) United States Patent
Shih

(10) Patent No.: US 11,429,545 B2
(45) Date of Patent: Aug. 30, 2022

(54) METHOD AND APPARATUS FOR DATA READS IN HOST PERFORMANCE ACCELERATION MODE

(71) Applicant: Silicon Motion, Inc., Zhubei (TW)

(72) Inventor: Po-Yi Shih, Zhubei (TW)

(73) Assignee: SILICON MOTION, INC., Zhubei (TW)

( * ) Notice: Subject to any disclaimer, the term of this patent is extended or adjusted under 35 U.S.C. 154(b) by 0 days.

(21) Appl. No.: 17/324,762

(22) Filed: May 19, 2021

(65) Prior Publication Data

US 2022/0019547 A1 Jan. 20, 2022

Related U.S. Application Data

(60) Provisional application No. 63/052,717, filed on Jul. 16, 2020.

(30) Foreign Application Priority Data

Oct. 12, 2020 (CN) .......................... 202011084288.7

(51) Int. Cl.
*G06F 13/16* (2006.01)
*G06F 12/0875* (2016.01)
*G06F 12/1009* (2016.01)

(52) U.S. Cl.
CPC ...... *G06F 13/1668* (2013.01); *G06F 12/0875* (2013.01); *G06F 12/1009* (2013.01); *G06F 2212/1024* (2013.01); *G06F 2212/608* (2013.01)

(58) Field of Classification Search
None
See application file for complete search history.

(56) References Cited

U.S. PATENT DOCUMENTS 9,348,783 B2 5/2016 Kelly et al.
9,547,447 B2 * 1/2017 Bauman .............. G06F 13/4068
(Continued)

FOREIGN PATENT DOCUMENTS

CN 101273363 A 9/2008
CN 104809075 A 7/2015
(Continued)

OTHER PUBLICATIONS

English translation of the Taiwanese Search Report for Taiwanese Application No. 109135089, dated Jul. 18, 2021.

*Primary Examiner* — Michael Sun
(74) *Attorney, Agent, or Firm* — Birch, Stewart, Kolasch & Birch, LLP

(57) ABSTRACT

The invention relates to methods, and an apparatus for data reads in a host performance acceleration (HPA) mode. One method is performed in a host side to include: obtaining a value of an extended device-specific data (Ext_CSD) register in a flash controller from the flash controller, where the host side and the flash controller communicate with each other in an embedded multi-media card (eMMC) protocol; and allocating space in a system memory as an HPA buffer, and storing a plurality of first logical-block-address to physical-block-address (L2P) mapping entries obtained from the flash controller when the value of the Ext_CSD register comprises information indicating that an HPA function is supported, where each L2P mapping entry stores information indicating which physical address that user data of a corresponding logical address is physically stored in a flash device.

20 Claims, 11 Drawing Sheets

(56) References Cited

U.S. PATENT DOCUMENTS

| | | | |
|---|---|---|---|
| 9,940,028 | B2 | 4/2018 | Tomlin |
| 10,120,601 | B2 * | 11/2018 | Matsushita ............. G06F 3/065 |
| 2012/0221775 | A1 | 8/2012 | Kim et al. |
| 2014/0208007 | A1 | 7/2014 | Cohen et al. |
| 2016/0179375 | A1 * | 6/2016 | Ki ....................... G06F 12/0246 |
| | | | 711/153 |
| 2019/0235762 | A1 * | 8/2019 | Kaburaki ............ G06F 12/0864 |
| 2020/0073593 | A1 | 3/2020 | Chen et al. |
| 2020/0319812 | A1 * | 10/2020 | He ....................... G06F 3/0604 |
| 2021/0011862 | A1 * | 1/2021 | Chiu ................... G06F 12/0246 |

FOREIGN PATENT DOCUMENTS

| | | |
|---|---|---|
| JP | 5999926 B2 | 9/2016 |
| TW | 1537724 B | 6/2016 |
| TW | I567551 B | 1/2017 |
| TW | 202009936 A | 3/2020 |
| WO | WO 2007/033321 A2 | 3/2007 |

* cited by examiner

METHOD AND APPARATUS FOR DATA READS IN HOST PERFORMANCE ACCELERATION MODE

CROSS-REFERENCE TO RELATED APPLICATIONS

This application claims the benefit of priority to U.S. Provisional Application Ser. No. 63/052,717, filed on Jul. 16, 2020; and Patent Application No. 202011084288.7, filed in China on Oct. 12, 2020; the entirety of which is incorporated herein by reference for all purposes.

BACKGROUND

The disclosure generally relates to storage devices and, more particularly, to a method, and an apparatus for data reads in a host performance acceleration (HPA) mode.

Flash memory devices typically include NOR flash devices and NAND flash devices. NOR flash devices are random access—a central processing unit (CPU) accessing a NOR flash device can provide the device any address on its address pins and immediately retrieve data stored in that address on the device's data pins. NAND flash devices, on the other hand, are not random access but serial access. It is not possible for NAND to access any random address in the way described above. Instead, the CPU has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word.

To improve the performance for reading and programming data from and into a flash device, the flash controller utilizes multiples channels to perform the data reads and writes in parallel. In order to gain advantage of parallel processing, continuous data is distributed to be stored in flash units connected to the channels and logical-to-physical mapping (L2P) tables are used to record mapping relationships between logical addresses (managed by a host side) and physical addresses (managed by the flash controller) for user-data segments. However, in the storage device of the embedded multi-media card (e●MMC/eMMC), with the rapid increase in device capacity, the length of logical-to-physical mapping (L2P) table also multiplies, resulting in the burden of conventional management method performed on the device side unaffordable. Although the performance of L2P translation is improved with the use of hierarchical Sub-Regions to manage the L2P table, the time spent in the L2P translation is still much greater than the time (tR) to transfer data from the flash array of the flash device to the data register of the flash controller. Thus, it is desirable to have a method, and an apparatus for data reads in host performance acceleration mode to improve the performance of data reads in an eMMC storage.

SUMMARY

In an aspect of the invention, an embodiment introduces a method for data reads in a host performance acceleration (HPA) mode, performed by a host side, to include: obtaining a value of an extended device-specific data (Ext_CSD) register in a flash controller from the flash controller, where the host side and the flash controller communicate with each other in an embedded multi-media card (eMMC) protocol; and allocating space in a system memory as an HPA buffer, and storing a plurality of first logical-block-address to physical-block-address (L2P) mapping entries obtained from the flash controller when the value of the Ext_CSD register comprises information indicating that an HPA function is supported, where each L2P mapping entry stores information indicating which physical address that user data of a corresponding logical address is physically stored in a flash device.

In another aspect of the invention, an embodiment introduces a method for data reads in an HPA mode, performed by a flash controller, to include: setting a reserved bit of an Ext_CSD register in a flash controller to indicate that a storage device supports an HPA function during an initialization of the storage device, thereby enabling a host side to allocate space in a system memory as an HPA buffer according to information of the reserved bit of the Ext_CSD register, and store L2P mapping entries obtained from the flash controller in the HPA buffer. Each L2P mapping entry stores information indicating which physical address that user data of a corresponding logical address is physically stored in a flash device, and the host side and the flash controller communicate with each other in an eMMC protocol.

In still another aspect of the invention, an embodiment introduces an apparatus for data reads in an HPA mode to include: an Ext_CSD register; a host I/F; and a processing unit. The processing unit is arranged operably to set a reserved bit of the Ext_CSD register to indicate that the apparatus supports an HPA function during an initialization of the apparatus, thereby enabling the host side to allocate space in a system memory as an HPA buffer according to information of the reserved bit of the Ext_CSD register, and store L2P mapping entries obtained from the apparatus in the HPA buffer. The L2P mapping entry stores information indicating which physical address that user data of a corresponding logical address is physically stored in a flash device, and the host side and the apparatus communicate with each other in an eMMC protocol.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

Figure 1:
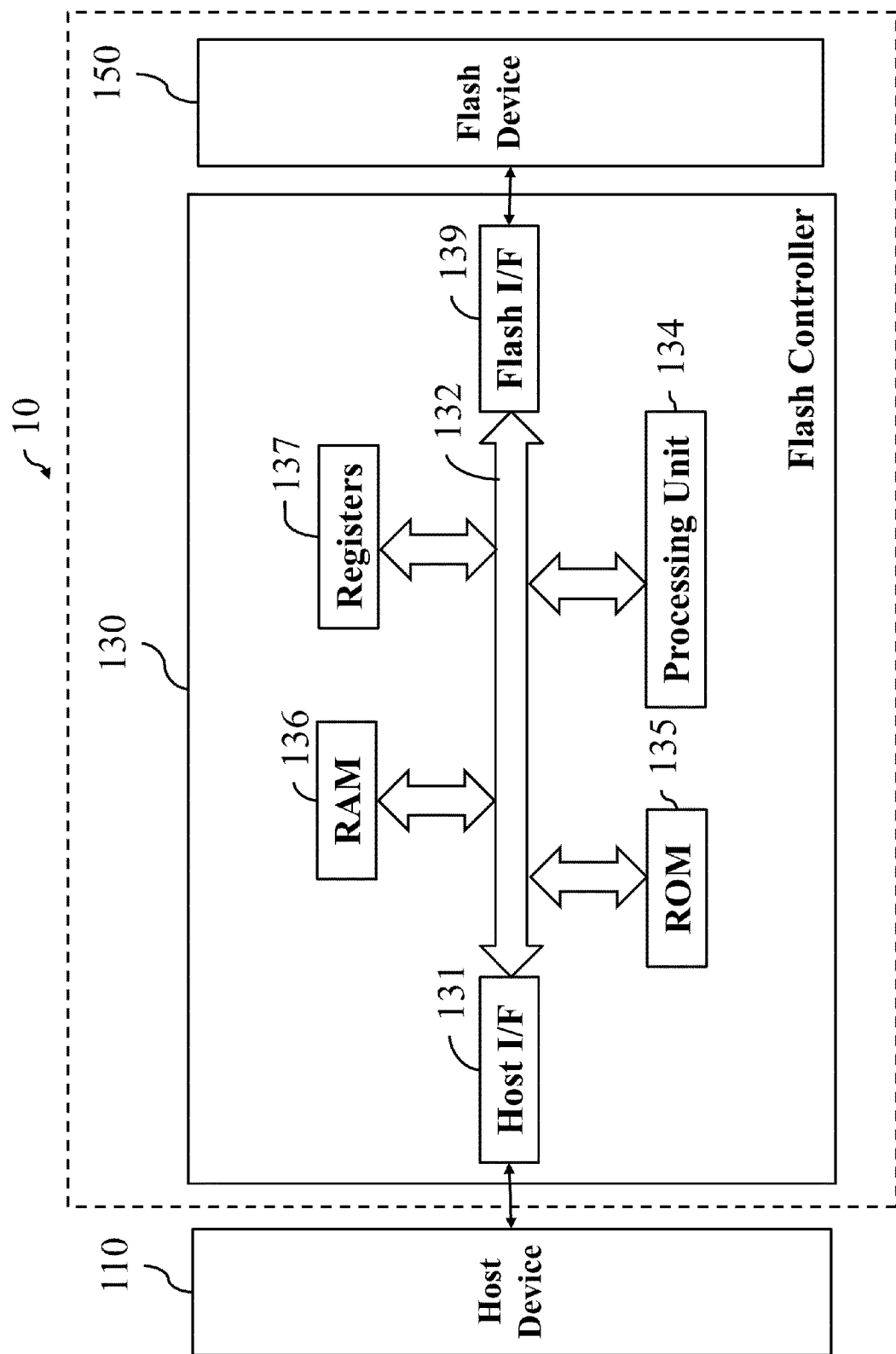
FIG. 1 is the system architecture of electronic apparatus according to an embodiment of the invention.

Refer to FIG. 1. The electronic apparatus 10 includes the host device (also referred to as a host side) 110, the flash controller 130 and the flash device 150, and the flash controller 130 and the flash device 150 may be collectively referred to as a device side. The electronic apparatus 10 may be equipped with a Personal Computer (PC), a laptop PC, a tablet PC, a mobile phone, a digital camera, a digital recorder, or other consumer electronic products. The host side 110 and the host interface (I/F) 131 of the flash controller 130 may communicate with each other in the embedded multi-media card (e●MMC/eMMC) protocol. The flash I/F 139 of the flash controller 130 and the flash device 150 may communicate with each other by a Double Data Rate (DDR) protocol, such as Open NAND Flash Interface (ONFI), DDR Toggle, or others. The flash controller 130 includes a processing unit 134 and the processing unit 134 may be implemented in numerous ways, such as with general-purpose hardware (e.g., a microcontroller unit, a single processor, multiple processors or graphics processing units capable of parallel computations, or others) that is programmed using firmware and/or software instructions to perform the functions recited herein. The processing unit 134 receives eMMC commands through the host I/F 131, schedules and executes these commands. The flash controller 130 includes the Random Access Memory (RAM) 136 and the RAM 136 may be implemented in a Dynamic Random Access Memory (DRAM), a Static Random Access Memory (SRAM), or the combination thereof, for allocating space as a data buffer. The RAM 136 stores necessary data in execution, such as variables, data tables, data abstracts, and so on. The flash controller 130 includes the Read Only Memory (ROM) for storing program code that is required to be executed in the system booting. The flash I/F 139 includes a NAND flash controller (NFC) to provide functions that are required to access to the flash device 150, such as a command sequencer, a Low Density Parity Check (LDPC) encoder/decoder, etc.

The flash controller 130 includes registers 137 for storing a wide range of parameter values. In the eMMC specification (such as e●MMC Electrical Standard 5.1 published in February 2015), the registers 137 include such as the 32-bit Operation Condition Register (OCR), the 128-bit Device Identification (CID) register, the 128-bit Device-Specific Data (CSD) register, the 512-byte Extended CSD (referred to as Ext_CSD) register, etc. The Ext_CSD register defines the device properties and selected modes. The most significant 320 bytes are the properties segment that defines the device capabilities and cannot be modified by the host side 110. The lower 192 bytes are the modes segment that defines the configuration that the device is working in. The host side 110 may change these modes by means of the SWITCH command (CMD6). Several areas in the Ext_CSD register are reserved in the eMMC specification, that can be freely used by device-side manufacturers to complete the function of Host Performance Acceleration (HPA) mode.

The bus architecture 132 may be configured in the flash controller 130 for coupling between components to transfer data, addresses, control signals, etc., which include the host I/F 131, the processing unit 134, the ROM 135, the RAM 136, the registers 137, the flash I/F 139, and so on. In some embodiments, the host I/F 131, the processing unit 134, the ROM 135, the RAM 136, the registers 137, the flash I/F 139 are coupled to each other by a single bus. In alternative embodiments, a high-speed bus is configured in the flash controller 130 for coupling the processing unit 134, the registers 137 and the RAM 136 to each other and a low-speed bus is configured for coupling the processing unit 134, the host I/F 131 and the flash I/F 139 to each other. The bus includes a set of parallel physical-wires connected to two or more components of the flash controller 130.

The flash device 150 provides huge storage space typically in hundred Gigabytes (GB), or even several Terabytes (TB), for storing a wide range of user data, such as high-resolution images, audio files, video files, etc. The flash device 150 includes control circuits and memory arrays containing memory cells that can be configured as Single Level Cells (SLCs), Multi-Level Cells (MLCs), Triple Level Cells (TLCs), Quad-Level Cells (QLCs), or any combinations thereof. The processing unit 134 programs user data into a designated address (a destination address) of the flash device 150 and reads user data from a designated address (a source address) thereof through the flash I/F 139. The flash I/F 139 may use several electronic signals run on physical wires including data lines, a clock signal line and control signal lines for coordinating the command, address and data transfer with the flash device 150. The data lines may be used to transfer commands, addresses, read data and data to be programmed; and the control signal lines may be used to transfer control signals, such as Chip Enable (CE), Address Latch Enable (ALE), Command Latch Enable (CLE), Write Enable (WE), etc.

Figure 2:
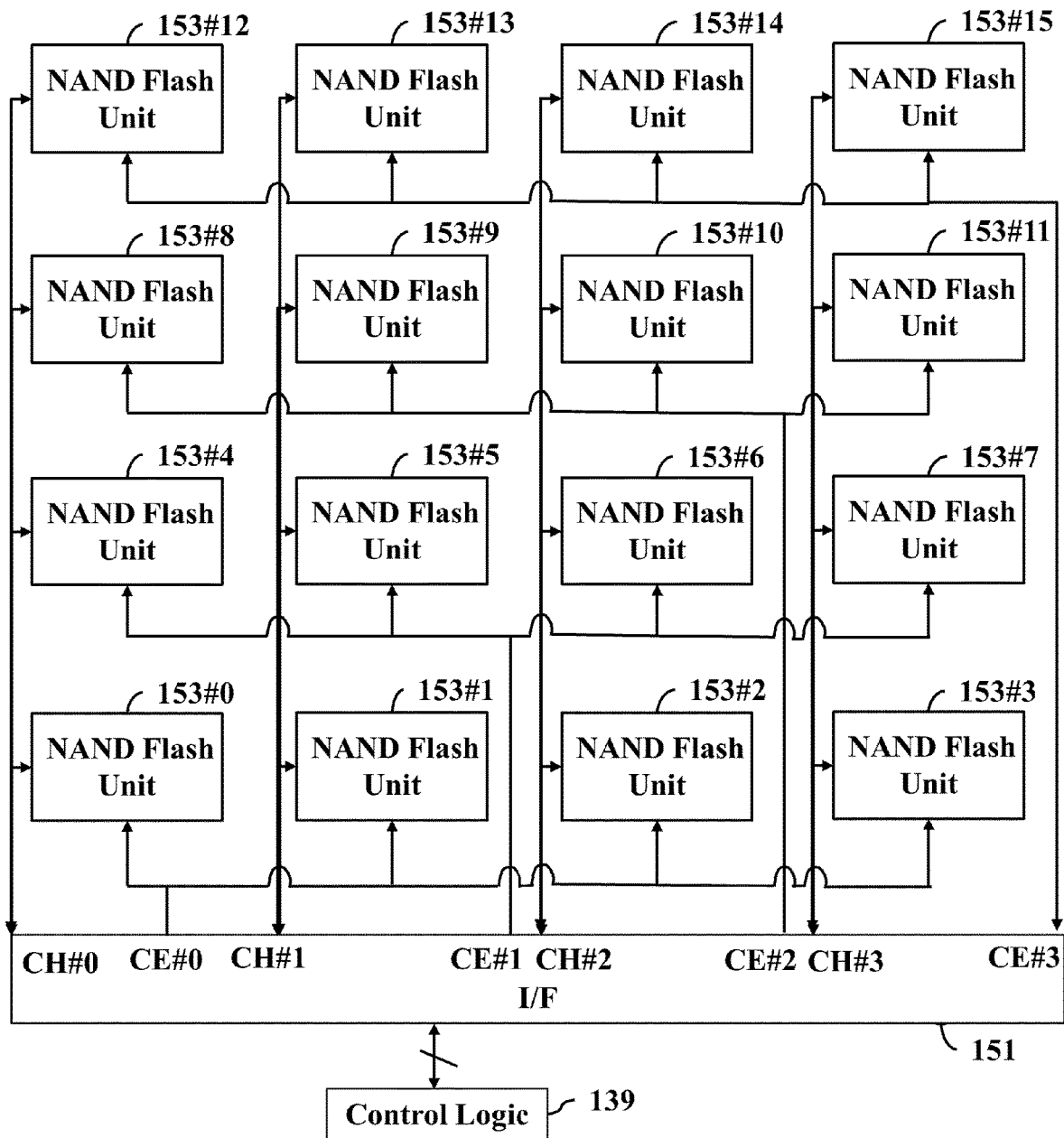
FIG. 2 is a schematic diagram illustrating a flash device according to an embodiment of the invention.

Refer to FIG. 2. The I/F 151 of the flash device 150 may include four I/O channels (hereinafter referred to as channels) CH #0 to CH #3 and each is connected to four NAND flash units, for example, the channel CH #0 is connected to the NAND flash units 153#0, 153#4, 153#8 and 153#12. Each NAND flash unit can be packaged in an independent die. The flash I/F 139 may issue one of the CE signals CE#0 to CE#3 through the I/F 151 to activate the NAND flash units 153#0 to 153#3, the NAND flash units 153#4 to 153#7, the NAND flash units 153#8 to 153#11, or the NAND flash units 153#12 to 153#15, and read data from or program data into the activated NAND flash units in parallel.

Figure 3:
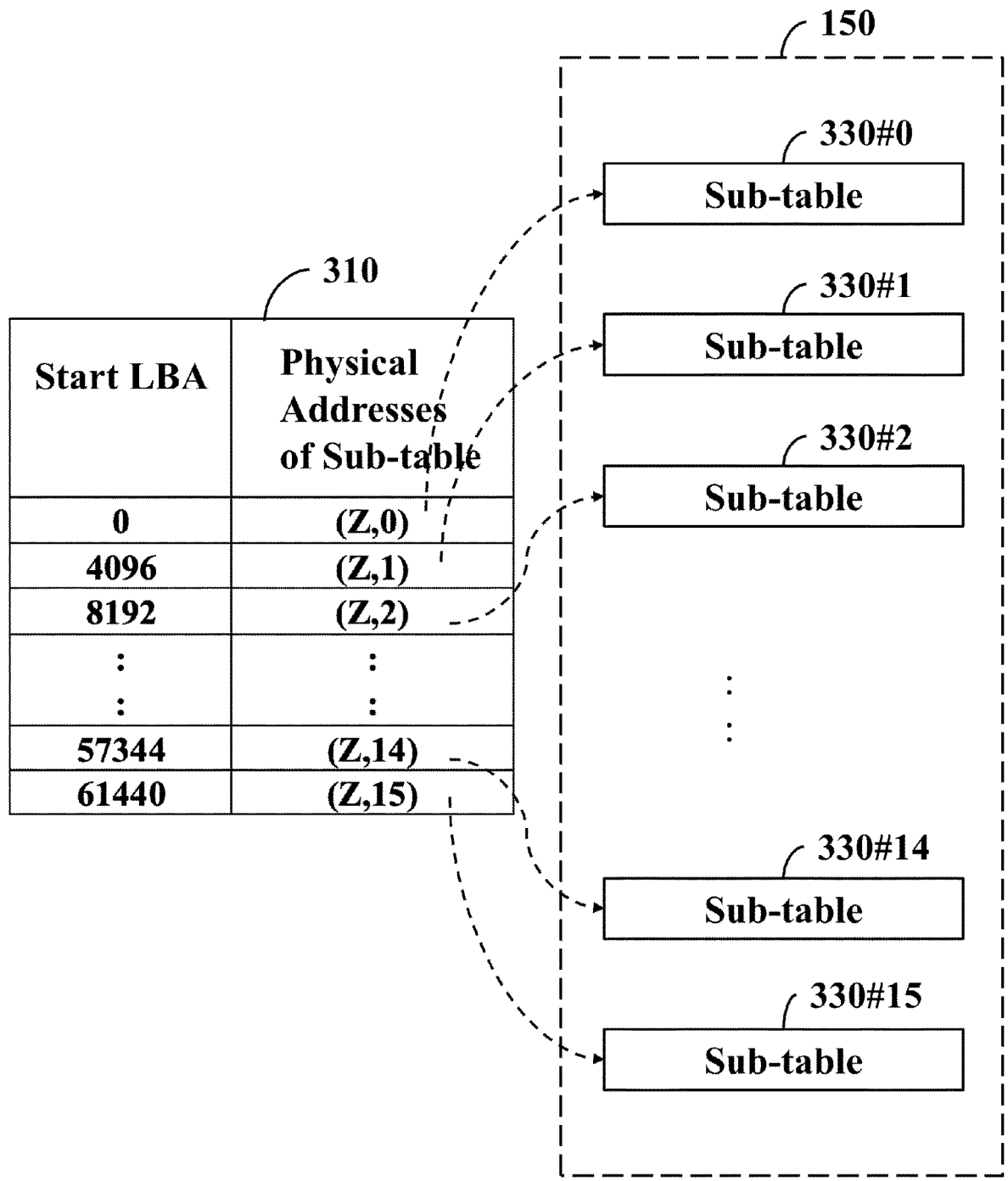
FIG. 3 is a schematic diagram illustrating the association between a high-level mapping table and logical-block-address to physical-block-address (L2P) mapping sub-tables according to an embodiment of the invention.

Since continuous data, that is, data of continuous logical block addresses (LBAs), is distributed to be stored in NAND flash units connected to multiple channels, the flash controller 130 uses a logical-block-address to physical-block-address (L2P) mapping table to record mapping relationships between logical addresses (managed by the host device 110) and physical addresses (managed by the flash controller 130) for user-data segments. The L2P mapping table includes multiple records arranged in the order of logical addresses and each record stores information indicating which physical address that user data of the corresponding logical address is physically stored in the flash device 150. Data of continuous LBA range may be divided into several regions individually identified in a region number, and each region may be further divided into several sub-regions individually identified in a sub-region number. For example, 128 GB of data addressed by LBA may be divided into 16 8 GB regions, and each 8 GB region may be further divided into 256 32 MB sub-regions. In the eMMC specification, each LBA is associated with (or points to) 512 B of data. However, since the RAM 136 cannot provide enough space to store the entire L2P mapping table for fast look-up when the processing unit 134 performs data reads, the whole L2P mapping table is divided into multiple sub-tables, which are stored in different physical addresses of the nonvolatile storage device 150, according to the divisions of regions and sub-regions. Therefore, only the corresponding sub-tables are read from the flash device 150 and stored in the RAM 136 for the L2P translation in data reads. Refer to FIG. 3. The whole L2P mapping table is divided into sub-tables 330#0~330#15. The processing unit 134 further maintains a high-level mapping table 310, which contains multiple records arranged in the order of the logical addresses. Each record stores information indicating which physical address that the corresponding sub-table for a designated logical address range is physically stored in. For example, the sub-table 330#0 associated with the 0th to the 4095th LBAs is stored in the 0th physical page of the designated physical block of the designated LUN (the letter "Z" represents the number of the designated physical block and the designated LUN), the sub-table 330#1 associated with the 4096th to the 8191th LBAs is stored in the 1st physical page of the designated physical block of the designated LUN, and the remaining can be deduced by analogy. Although FIG. 3 shows 16 sub-tables only, those artisans may modify the design to provide more sub-tables depending on the capacity of the flash device 150, and the invention should not be limited thereto.

Figure 4:
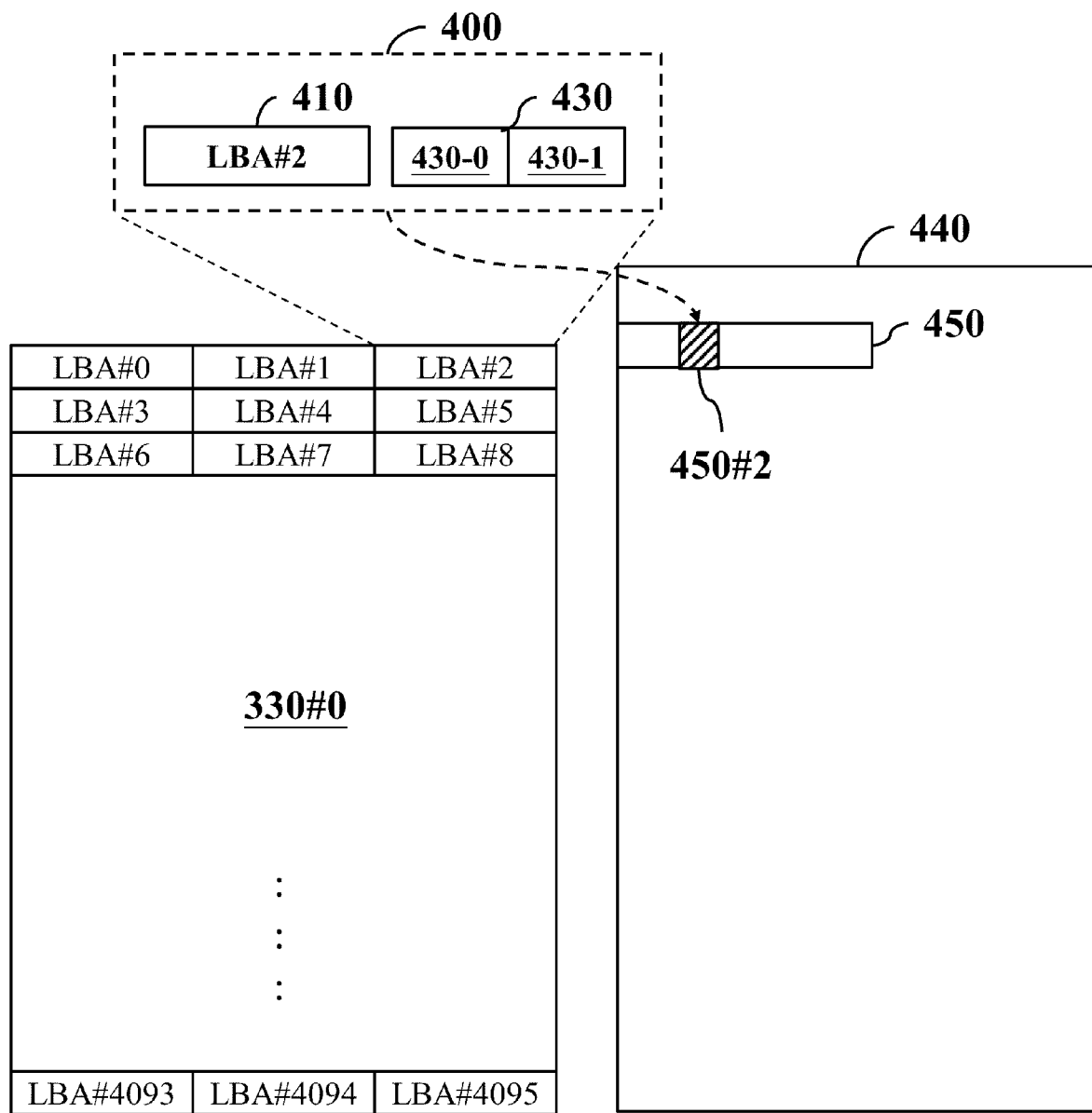
FIG. 4 is a schematic diagram illustrating a mapping of a L2P mapping sub-table to space of a physical page according to an embodiment of the invention.

To match the physical configuration of the flash device 150, the flash controller 130 may associate a physical block address (PBA) with (or point to) 4 KB, 8 KB or 16 KB data, which is longer than the length (512 B) of the data associated with one LBA, defined in the eMMC specification. Because the length of data associated with the LBA and the PBA is not equal, each record in each sub-table contains the information of both the logical address and the physical address, which is used to indicate the designated address in the flash device 150 precisely. Refer to FIG. 4. The sub-table 330#0 stores addressing information from LBA#0 to LBA#4095 sequentially. The addressing information may be represented in eight bytes: four bytes represent an LBA; and the other four bytes represent a PBA. For example, the record 400, which is associated with LBA#2, in the sub-table 330#0 stores the information of both the LBA 410 and the PBA 430. The two bytes 430-0 of the PBA 430 stores a LUN and a physical block number; and the other two bytes 430-1 of the PBA 430 stores a physical page number. Thus, the addressing information 400 corresponding to LBA#2 points to the designated sector 450#2 in the physical page 450 of the physical block 440.

Figure 5:
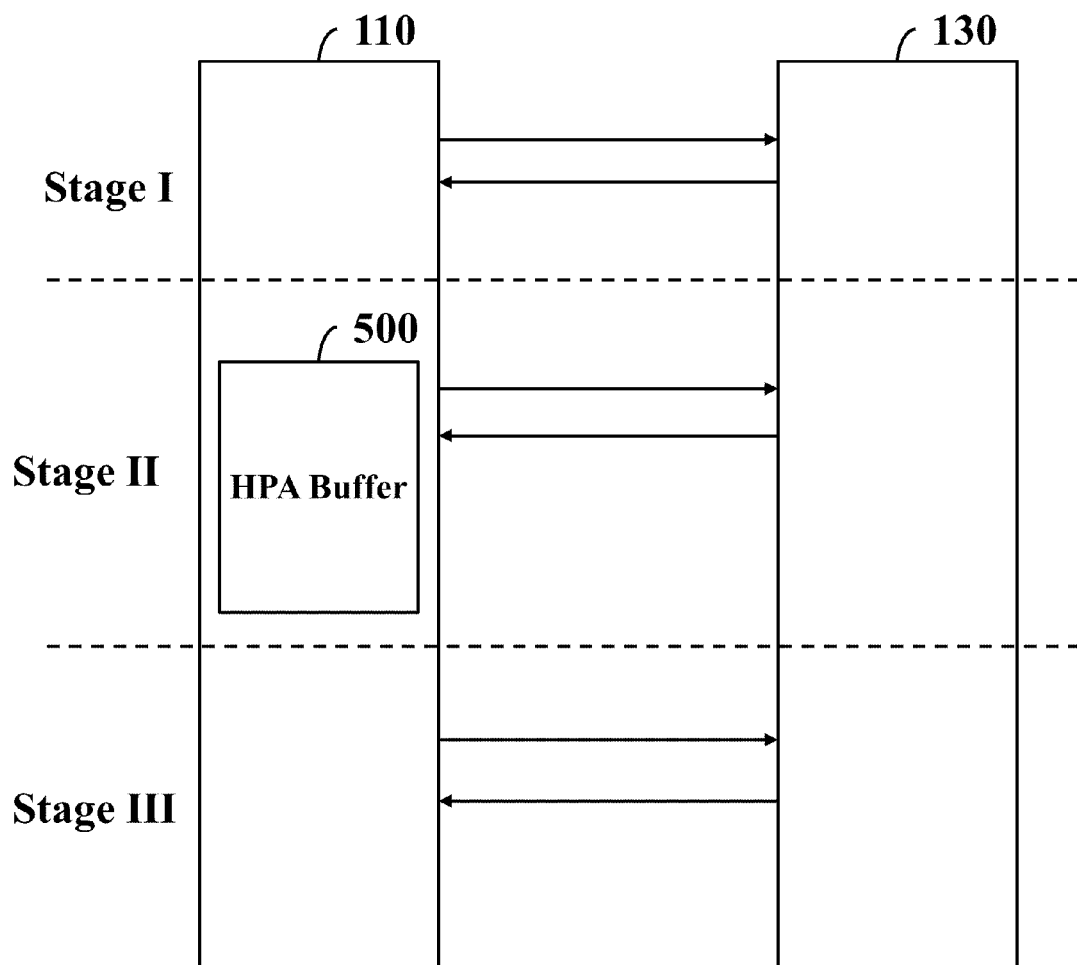
FIG. 5 is a schematic diagram for establishing and using a host performance acceleration (HPA) buffer according to an embodiment of the invention.

To address the problems that the flash controller 130 spends excessive time to perform the L2P translation, embodiments of the invention adds new functions for HPA on the basis of the host-device communications architecture defined in the updated eMMC specification. HPA transfers the workload of the L2P translation that the flash controller 130 needs to consume excessive time to perform originally to the host side 110, so that the random read performance of short-length data would be improved. Short-length data may indicate data whose length is from 512 B to 32 KB. Refer to FIG. 5. The host side 110 allocates space of its system memory as an HPA buffer 500 for temporarily storing information of the L2P mapping table maintained by the device side. The HPA buffer 500 stores multiple L2P mapping entries received from the device side and each L2P mapping entry stores addressing information corresponding to one LBA. Subsequently, the host side 110 can issue commands carrying L2P mmaping records to obtain user data of the designated LBAs. The flash controller 130 can directly drive the flash I/F 139 to read user data of the designated LBAs according to the information of L2P mmaping records, without spending time and computing resources to read the corresponding sub-table from the flash device 150 and perform the L2P translation as before. Operations of the establishment and utilization of HPA buffer 500 may be divided into three stages:

Stage I (HPA initiation): The host side 110 reads a value of the registers 137 in the flash controller 130 to inspect whether the eMMC storage (also referred to as the device side including at least the flash controller 130 and the flash device 150) supports the HPA function. If so, the host side 110 allocates space in its system memory for the HPA L2P table area.

Stage II (HPA mapping-table management): If the eMMC storage supports the HPA function, the host side 110 issues a series of commands requesting the flash controller 130 for reading the L2P mapping table. To respond to the commands, the flash controller 130 transmits the whole or a portion of the L2P mapping table to the host side 110, and the host side 110 stores the obtained mapping table (also referred to as the mirrored L2P mapping table) in the HPA L2P table area. After the actual L2P mapping table corresponding to the mirrored L2P mapping table has been changed because of the performance of data writes, data trimmings, a garbage collection (GC), a wear leveling process, or others, the flash controller 130 informs the host side 110 that the whole or the desiganted portion(s) of L2P mapping table of the system memory of the host side 110 needs to update.

Stage III (HPA read): The host side 110 issues a series of commands carryign the L2P mapping entry/entries to the eMMC storage to request to obtain data of the designated LBA(s) (especially discontinuous data in small chunk lengths, such as 512 B to 32 KB). Subsequently, the flash controller 130 reads data of the designated LBA(s) from the PBA(s) of the flash device 150 according to the content of L2P mapping entry/entries, and replies with the read data to the host side 110, so that the eMMC storage saves time to search the L2P mapping table for the PBA(s) corresponding to the requested LBA(s) and perform the L2P translations.

In the eMMC specification, Ext_CSD[160] (also referred to as PARTITIONING_SUPPORT[160]) defines supported partition features, in which Bits[7:3] are reserved for free use by manufacturers of eMMC storages. Ext_CSD[160], Bit[3] may be used to declare whether this eMMC storage supports the HPA function. If it does, Ext_CSD[160], Bit[3] is set to "0b1". If it disables the HPA function, Ext_CSD[160], Bit[3] is set to "0b0". During the initialization of eMMC storage, the processing unit 134 may set Ext_CSD[160], Bit[3] of the registers 137 to "0b1". Although the embodiments of the invention describe that Ext_CSD[160], Bit[3] is used to declare whether the HPA function is supported or disabled by the eMMC storage, those artisans may modify the design to use an arbitrary bit of other registers, such as Ext_CSD[511:506], [485:309], [306], [233], [227], [204], [195], [193], [190], [188], [186], [184], [182], [180], [176], [172], [170], [135], [129:128], [127:64], [28:27], [14:0], etc., and the invention should not be limited thereto.

Moreover, the flash controller 130 may use paired bytes of Ext_CSD to record information indicating that the designated sub-regions of the designated regions and of the L2P mapping table buffered (or mirrored) in the host side 110 needs to update. The register Ext_CSD[64] and Ext_CSD[66] are one of paired bytes to indicate the Region#0 and the SubRegion#160, respectively, and the register Ext_CSD[65] and Ext_CSD[67] are another of paired bytes to indicate the Region#0 and the SubRegion#18 as another pair, respectively.

In the eMMC specification, the SWITCH command (CMD6) is issued by the host side 110 to switch the mode of operation of the selected device or modify the values of Ext_CSD registers, in which the argument Bits[31:16] are reserved. The host side 110 may set CMD6, Bit[26] to indicate whether to activate the HPA function. If it does, CMD6, Bit[26] is set to "0b1". If it attempts to deactivate the HPA function, CMD6, Bit[26] is set to "0b0". Although the embodiments of the invention describe that CMD6, Bit[26] is used to indicate whether the HPA function is activated, those artisans may modify the design to use other reserved bit of the CMD6's argument to practice the same or similar feature, and the invention should not be limited thereto. The host side 110 may set CMD6, Bit[27] to indicate whether to activate the acquisition of L2P mapping table. If it does, CMD6, Bit[27] is set to "0b1". If it attempts to deactivate the acquisition of L2P mapping table, CMD6, Bit[27] is set to "0b0". Although the embodiments of the invention describe that CMD6, Bit[27] is used to indicate whether the acquisition of L2P mapping table is activated, those artisans may modify the design to use other reserved bit of the CMD6's argument to practice the same or similar feature, and the invention should not be limited thereto.

In the eMMC specification, the SET_BLOCK_COUNT command (CMD23) is issued by the host side 110 with an argument to notify of the number of blocks (read/write) for the following packed write command or for the header of the following packed read command. When CMD23 is associated with one following packed write command, Bit[30] of the argument is set to "0b1" to indicate a packed command and Bits[15:0] are set to declare the number of blocks for the following packed write command. When CMD23 is associated with one following packed read command, Bit[30] of the argument is set to "0b1" to indicate a packed command and Bits[15:0] are set to declare the number of blocks for the header of the following packed read command.

In the eMMC specification, the WRITE_MULTIPLE_BLOCK command (CMD25) is issued by the host side to continuously writes (or transfers) blocks of data to the eMMC storage until a STOP_TRANSMISSION command (CMD12) follows or the requested number of data blocks have been written (or transferred). The host side 110 may send information indicating the designated sub-region(s) of the designated region(s) of the L2P mapping table via CMD23 and CMD25 to request the flash controller 130 to prepare the L2P mapping entries in the sub-region(s) of the designated region(s). Moreover, the host side 110 may transmit the L2P mapping entries via CMD23 and CMD25 to request the flash controller 130 to prepare data for subsequent read-back accordingly. The argument Bits[31:0] of CMD25 indicate a data address.

In the eMMC specification, the READ_MULTIPLE_BLOCK command (CMD18) is issued by the host side 110 to continuously obtain data blocks from the eMMC storage until interrupted by a stop command, or the requested number of data blocks have been obtained. That is, CMD18 requests the eMMC storage to transfer the previously indicated number of data blocks to the host side 110. The argument Bits[31:0] of CMD18 indicate a data address. The host side 110 may request the flash controller 130 to transmit the L2P mapping entries of the designated sub-region(s) of the designated region(s) (defined in the previous CMD25) via CMD 23 and CMD18. Refer to the example as shown in FIG. 4. The length of each L2P mapping entry is 8 B and each data block may carry at most 32 L2P mapping entries. Moreover, the host side 110 may request the flash controller 130 to transmit data corresponding to the designated L2P mapping entry/entries (defined in the previous CMD25) via CMD23 and CMD18.

In the eMMC specification, the normal response command (R1) is issued by the flash controller 130 to notify the host side 110 of a specific message. The length of R1 is 48 bits, in which Bits[45:40] indicate the index of the command to be responded to, and Bits[39:8] indicate the device status. Bit[31] of R1 being set to "0b1" indicates the ADDRESS_OUT_OF_RANGE. Bit[30] of R1 being set to "0b1" indicates the ADDESS_MISALIGN. Since the HPA function is activated but the acquisition function for the L2P mapping table is not activated, if certain PBA(s) of the L2P mapping entries carried in CMD25 is/are invalid, then the flash controller 130 may set Bit[31] and Bit[30] of R1 for responding to the forthcoming CMD18 to "0b1" to indicate that the L2P mapping entries buffered in the host side 110 need to update.

For establishing the HPA L2P table area (also referred to as the HPA buffer) in stages I and II, after eMMC storage has been initialized, the host side 110 reads the L2P mapping table from the device side for the first time, and stores it in the HPA buffer. Table 1 describes details of exemplary command sequence for initializing the HPA buffer:

TABLE 1

| eMMC Command and Argument | Description |
| --- | --- |
| SWITCH 0x0C000000 | Requests the eMMC storage to activate the HPA function, and the acquisition function for the L2P mapping table, so as to initialize the HPA buffer. |

TABLE 1-continued

| eMMC Command and Argument | Description |
|---|---|
| SET_BLOCK_COUNT 0x40000001 | Notifies the eMMC storage of a packed command, and a block count indicating how many blocks of data will be written to the eMMC storage. Each block contains 512 B of data. |
| WRITE_MULTIPLE_BLOCK 0x01E2A3E0 | Requests the eMMC storage to obtain the indicated number of data blocks, where each block describes information regarding the specific portion(s) of the L2P mapping table. |
| SET_BLOCK_COUNT 0x40000020 | Notifies the eMMC storage of a packed command, and a block count indicating how many blocks of data will be read from the eMMC storage. Each block contains 512 B of data. |
| READ_MULTIPLE_BLOCK 0x01E2A3E0 | Requests the eMMC storage to transfer the indicated number of data blocks, where each block carries multiple L2P mapping entries. |
| SEND_STATUS 0xCCCC0000 | Notifies the eMMC storage of a completion of HPA mapping reads. |

Figure 6:
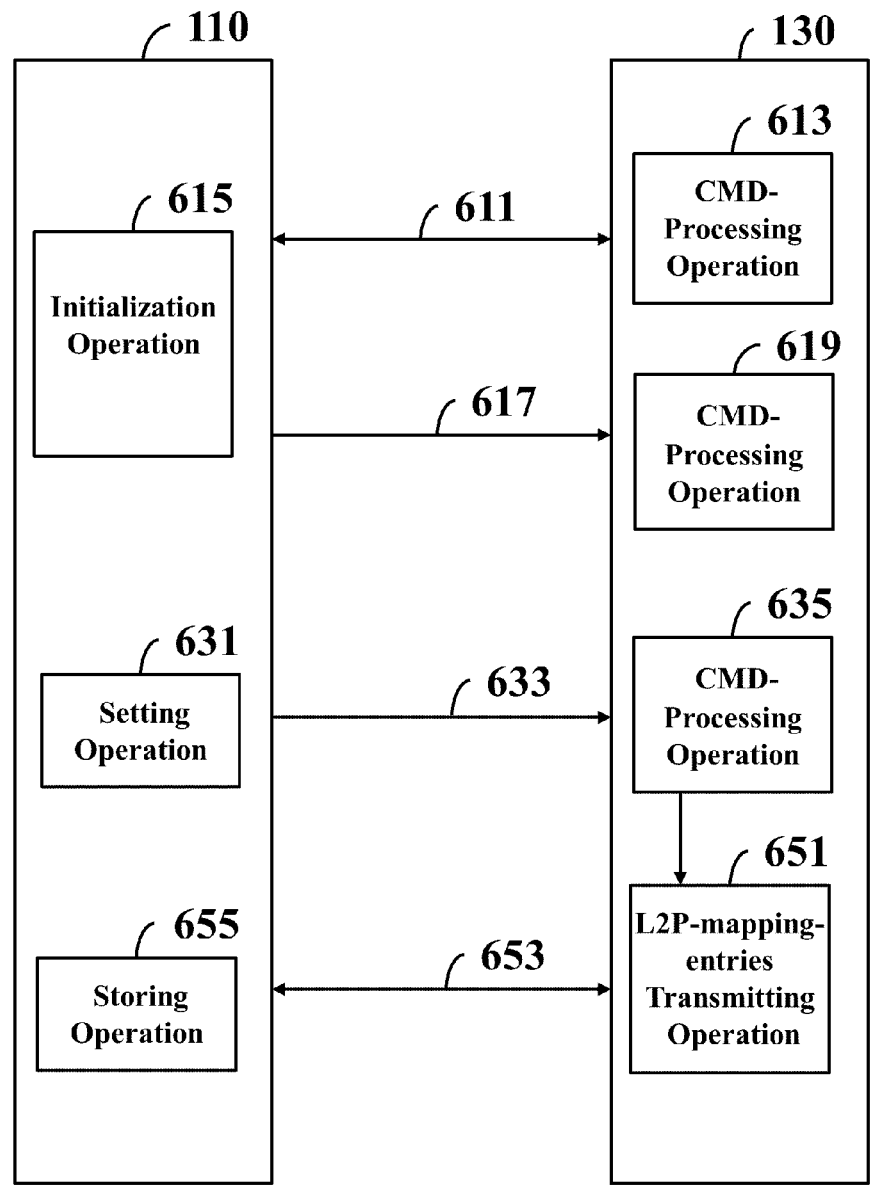
FIG. 6 is a schematic diagram showing an operation sequence for initializing the HPA buffer according to an embodiment of the invention.

Refer to FIG. 6 showing the operation sequence for initializing the HPA buffer. Details are described as follows:

Operation 611: The host side 110 issues a command to the flash controller 130 to request the flash controller for values of the Ext_CSD registers.

Operation 613: To respond to the received register read command through the host I/F 131, the processing unit 134 obtains the values of Ext_CSD registers, and replies with the values to the host side 110.

Operation 615: The host side 110 may exam the values of the Ext_CSD registers (such as, Ext_CSD[160], Bit[3]) to determine whether the eMMC storage supports the HPA function. If so, the process proceeds to the operation 617. Otherwise, the host side 110 does not activate the HPA function.

Operation 617: The host side 110 issues CMD6 to the flash controller 130 to activate the HPA function, and the acquisition function for the L2P mapping table. For example, refer to the second row of Table 1. The host side 110 may set the argument of CMD6 to "0x00000000", that is, including Bit[26]="0b1" and Bit[27]="0b1", which are used to instruct the flash controller 130 to activate these two functions.

Operation 619: After receiving the aforementioned SWITCH command, the flash controller 130 enters the HPA_Mapping_Read state to prepare transmission to the host side 110 for a portion or portions of L2P mapping table.

Operation 631: The host side 110 allocates space of its system memory as the HPA buffer, and determines the L2P mapping entries in designated sub-region(s) of designated region(s), that are to be obtained from the eMMC storage, depending on requirements for the operation system (OS), the drivers, the applications, or others.

Operation 633: The host side 110 issues CMD23 to the flash controller 130 to notify the flash controller 130 how many data blocks will be sent to the flash controller 130. For example, refer to the third row of Table 1. The host side 110 may set the argument of CMD23 to "0x40000001", that is, including Bit[30]="0b1" and Bits[15:0]="0x0001", which indicates that one data block will be written to the flash controller 130. Next, the host side 110 issues CMD25 to the flash controller 130 to continuously write data block(s) to the flash controller 130 until the requested number of data blocks have been written. For example, refer to the fourth row of Table 1. The host side may set the argument of CMD25 to "0x01E2A3E0" to indicate a specific data address. Each data block may include 32 packets and the length of each packet is 16 B. Two bytes of each packet may indicate the number of designated region and the remaining fourteen bytes may indicate several numbers of designated sub-regions. For example, one packet including information about {Region#0, SubRegion#0, SubRegion#1, SubRegion#2, SubRegion#3} indicates that the designated portions of L2P mapping table are associated with the $0^{th}$ to $3^{rd}$ sub-regions of the $0^{th}$ region. Subsequently, the host side 110 may issue CMD23 to the flash controller 130 to notify the flash controller 130 how many data blocks will be received from the flash controller 130. For example, refer to the fifth row of Table 1, the host side may set the argument of CMD23 to "0x40000020", that is, including Bit[30]="0b1" and Bits[15:0]="0x0020", which indicates that 32 data blocks will be read from the flash controller 130, i.e. at most 1024 L2P mapping entries. Subsequently, the host side 110 may issue CMD18 to the flash controller 130 to continuously read data blocks from the flash controller 130 until the requested number of data blocks have been read. For example, refer to the sixth row of Table 1. The host side may set the argument of CMD18 to "0x01E2A3E0" to indicate a specific data address.

Operation 635: Since the HPA_Mapping_Read state has been entered, when receiving the data blocks corresponding CMD25 from the host side 110, the flash controller 130 knows each packet of the data block carries information indicating the designated portion(s) of the L2P mapping table, and reads the requested L2P mapping entries from the flash device 150 accordingly. Additionally, when receiving CMD18 from the host side 110, the flash controller 130 knows that it can start to transmit the designated portion(s) of the L2P mapping entries to the host side 110. Because the argument of CMD18 is set to the same as that of CMD25, the data to be sent by the flash controller 130, which includes the designated portion(s) of the L2P mapping entries, is read from the flash device 150 according to the content of the data blocks corresponding to the previously received CMD25.

Operation 651: The flash controller 130 organizes the requested L2P mapping entries into multiple packets of the requested number of data blocks.

Operation 653: The flash controller 130 continuously transmits the organized data blocks to the host side 110 until the requested number of data blocks have been transmitted completely. Subsequently, when receiving the completion of packed reads, that is, the completion of HPA mapping reads from the host side 110, the flash controller 130 leaves the HPA Mapping Read state and enters the transfer state defined in the eMMC specification.

Operation 655: The host side 110 receives the L2P mapping entries carried in each packet, and stores them in the HPA buffer. After storing the L2P mapping entries of the last packet completely, the host side 110 issues the SEND_STATUS command (CMD13) including the completion of packed reads to the flash controller 130.

For data reads in stage III, Table 2 describes details of exemplary command sequence for reading data with the HPA function:

TABLE 2

| eMMC CMD & Arg. | Description |
|---|---|
| SWITCH 0x04000000 | Requests the eMMC storage to activate the HPA function to read data. |
| SET_BLOCK_COUNT 0x40000001 | Notifies the eMMC storage of a packed command, and a block count indicating how many blocks of data will be written to the eMMC storage. Each block contains 512 B of data. |

TABLE 2-continued

| eMMC CMD & Arg. | Description |
|---|---|
| WRITE_MULTIPLE_BLOCK 0x01521182 | Requests the eMMC storage for obtaining the indicated number of data blocks and each block describes pairs of LBA and PBA for HPA reads. |
| SET_BLOCK_COUNT 0x40000020 | Notifies the eMMC storage of a packed command, and a block count indicating how many blocks of data will be read from the eMMC storage. Each block contains 512 B of data. |
| READ_MULTIPLE_BLOCK 0x01521182 | Requests the eMMC storage to obtain the indicated number of data blocks, where each block carries the requested data associated with one LBA. |
| SEND_STATUS 0xCCCC0000 | Notifies the eMMC storage of a completion of HPA reads. |

Figure 7:
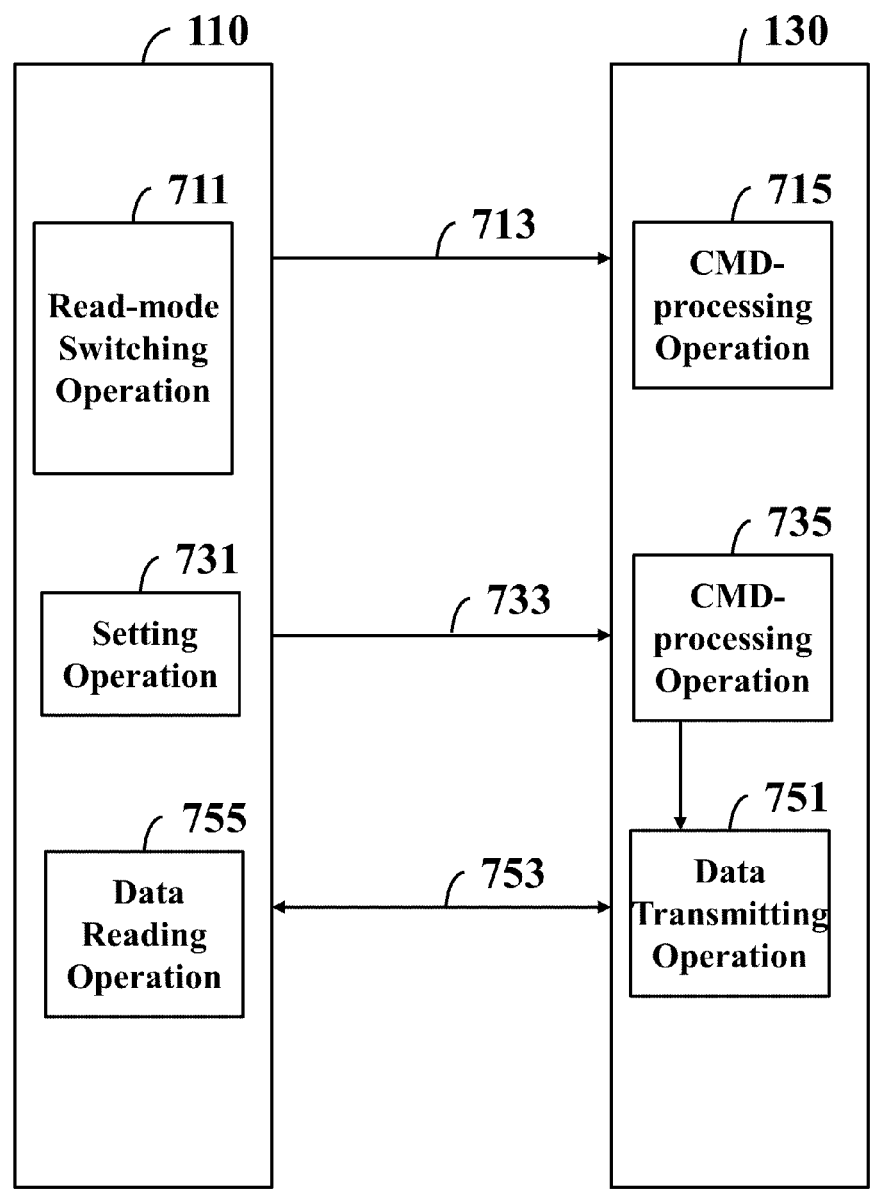
FIGS. 7 and 8 are schematic diagrams showing operation sequences for reading data with the HPA function according to an embodiment of the invention.

Refer to FIG. 7 showing the operation sequence for reading data with the HPA function. Details are described as follows:

Operation 711: The host side 110 discovers that short-length data reads are to be performed.

Operation 713: The host side 110 issues CMD6 to flash controller 130 to activate the HPA function. For example, refer to the second row of Table 2. The host side 110 may set the argument of CMD6 to "0x04000000", that is, including Bit[26]="0b1" and Bit[27]="0b0", which are used to instruct the flash controller 130 to activate the HPA function only.

Operation 715: After receiving the aforementioned SWITCH command, the flash controller 130 enters the HPA Read state.

Operation 731: The host side 110 searches the mirrored L2P mapping table in the HPA buffer to obtain the L2P mapping entries associated with multiple LBAs.

Operation 733: The host side 110 issues CMD23 to the flash controller 130 to notify the flash controller 130 how many data blocks will be sent to the flash controller 130. For example, refer to the third row of Table 2. The host side 110 may set the argument of CMD23 to "0x40000001", that is, including Bit[30]="0b1" and Bits[15:0]="0x0001", which indicates that one data block will be written to the flash controller 130. Next, the host side 110 issues CMD25 to the flash controller 130 to continuously write data block(s) to the flash controller 130 until the requested number of data blocks have been written. For example, refer to the fourth row of Table 1. The host side may set the argument of CMD25 to "0x01521182" to indicate a specific data address. Each data block may include 32 packets and the length of each packet is 16 B. Each packet carries information indicating one pair of LBA and PBA. Eight bytes of each packet may indicate the designated LBA and the remaining eight bytes may indicate the designated PBA. Subsequently, the host side 110 may issue CMD23 to the flash controller 130 to notify the flash controller 130 how many data blocks will be received from the flash controller 130. For example, refer to the fifth row of Table 1, the host side may set the argument of CMD23 to "0x40000020", that is, including Bit[30]="0b1" and Bits[15:0]="0x0020", which indicates that 32 data blocks will be read from the flash controller 130, i.e. data associated with at most 1024 LBAs. Subsequently, the host side 110 may issue CMD18 to the flash controller 130 to continuously read data blocks from the flash controller 130 until the requested number of data blocks have been read. For example, refer to the sixth row of Table 1. The host side may set the argument of CMD18 to "0x01521182" to indicate a specific data address.

Operation 735: Since the HPA Read state has been entered, when receiving the data blocks corresponding CMD25 from the host side 110, the flash controller 130 knows each packet of the data block carries information about a pair of LBA and PBA, and reads the requested data from the flash device 150 accordingly. Additionally, when receiving CMD18 from the host side 110, the flash controller 130 knows that it can start to transmit the designated data to the host side 110. Because the argument of CMD18 is set to the same as that of CMD25, the data to be sent by the flash controller 130, which is associated with the designated LBAs, is read from the flash device 150 according to the content of the data blocks corresponding to the previously received CMD25.

Operation 751: The flash controller 130 organizes the requested data into multiple packets of the requested number of data blocks.

Operation 753: The flash controller 130 continuously transmits the organized data blocks to the host side 110 until the requested number of data blocks have been transmitted completely. Subsequently, when receiving the completion of packed reads, the flash controller 130 leaves the HPA Read state and enters the transfer state defined in the eMMC specification.

Operation 755: The host side 110 receives the data carried in each packet, and stores it in the data buffer of its system memory. After storing the data of the last packet completely, the host side 110 issues the SEND STATUS command (CMD13) including the completion of packed reads to the flash controller 130.

Figure 8:
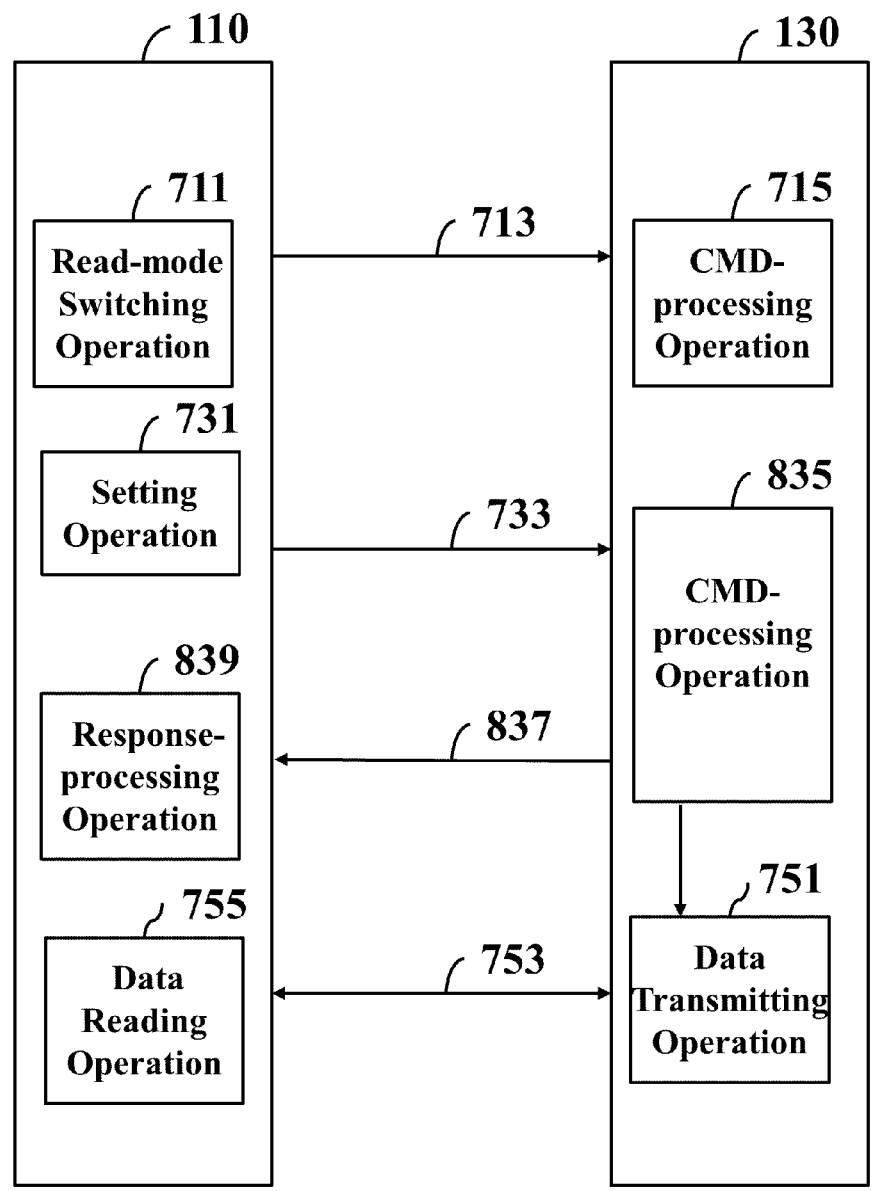

For updating the HPA buffer in stage II, during the device side operates, the host side 110 may request the flash controller 130 to perform data writes, data trims, block erases, or others, and the flash controller 130 may actively perform a Garbage Collection(GC), a wear leveling (WL) process, or others, resulting that partial content of the L2P mapping table is modified. Thus, the content of the HPA buffer (i.e. the mirrored L2P mapping table) needs to update to reflect the partial changes of the L2P mapping table. Refer to FIG. 8 showing the operation sequence for reading data with the HPA function, in which the technical details of the operations 711 to 733, and 751 to 753 are the same as that as shown in FIG. 7. Details of the other operations are described as follows:

Operation 835: Since the flash controller 130 has entered the HPA Read state, when receiving data blocks corresponding to CMD25 from the host side 110, the flash controller 130 knows that the information about a pair of LBA and PBA for a data read is carried in each packet, and inspects whether the LBA mapping entry associated with the LBA data to be read is modified (i.e. invalid). If so, then the flash controller 130 omits the information carried in the data block, and reads data from the flash device 150 according to the corresponding up-to-date LBA mapping entries instead. When receiving CMD18 from the host side 110, the flash controller 130 knows that it can start to transmit the designated data to the host side 110. Because the argument of CMD18 is set to the same as that of CMD25, the data to be sent by the flash controller 130 is read from the flash device 150 according to the content of the data blocks corresponding to the previously received CMD25, or the designated up-to-date LBA mapping entries. Additionally, when any L2P mapping entry corresponding to the LBA data to be read is invalid, the flash controller 130 sets the relevant Ext_CSD registers to store the information indicating that the designated sub-region(s) of the designated region(s) in the HPA buffer of the host side 110 needs/need to update.

Operation 837: The flash controller 130 issues the R1 for responding CMD18, in which the Bit[31] and the Bit[30] are set to "0b1" to indicate that the mirrored L2P mapping table in the host side 110 needs to update.

After receiving the message from the device side, which indicates that the mirrored L2P mapping table needs to update, the host side 110 obtains the information indicating that the designated sub-region(s) of the designated region(s) needs/need to update from the device side, reads the designated portion of L2P mapping entries of the L2P mapping table from the device side, and updates the corresponding content of the HPA buffer. Table 3 describes details of exemplary command sequence for updating the HPA buffer:

TABLE 3

| eMMC Command and Argument | Description |
| --- | --- |
| SWITCH 0x0C000000 | Requests the eMMC storage to activate the HPA function, and the acquisition function for the L2P mapping table, so as to initialize the HPA buffer. |
| SET_BLOCK_COUNT 0x40000001 | Notifies the eMMC storage of a packed command, and a block count indicating how many blocks of data will be written to the eMMC storage. Each block contains 512 B of data. |
| WRITE_MULTIPLE_BLOCK 0x01521182 | Requests the eMMC storage to obtain the indicated number of data blocks, where each block describes information regarding specific portion(s) of the L2P mapping table. |
| SET_BLOCK_COUNT 0x40000020 | Notifies the eMMC storage of a packed command, and a block count indicating how many blocks of data will be read from the eMMC storage. Each block contains 512 B of data. |
| READ_MULTIPLE_BLOCK 0x01521182 | Requests the eMMC storage to transfer the indicated number of data blocks, where each block carries multiple L2P mapping entries. |
| SEND_STATUS 0xCCCC0000 | Notifies the eMMC storage of a completion of HPA mapping reads. |

Figure 9:
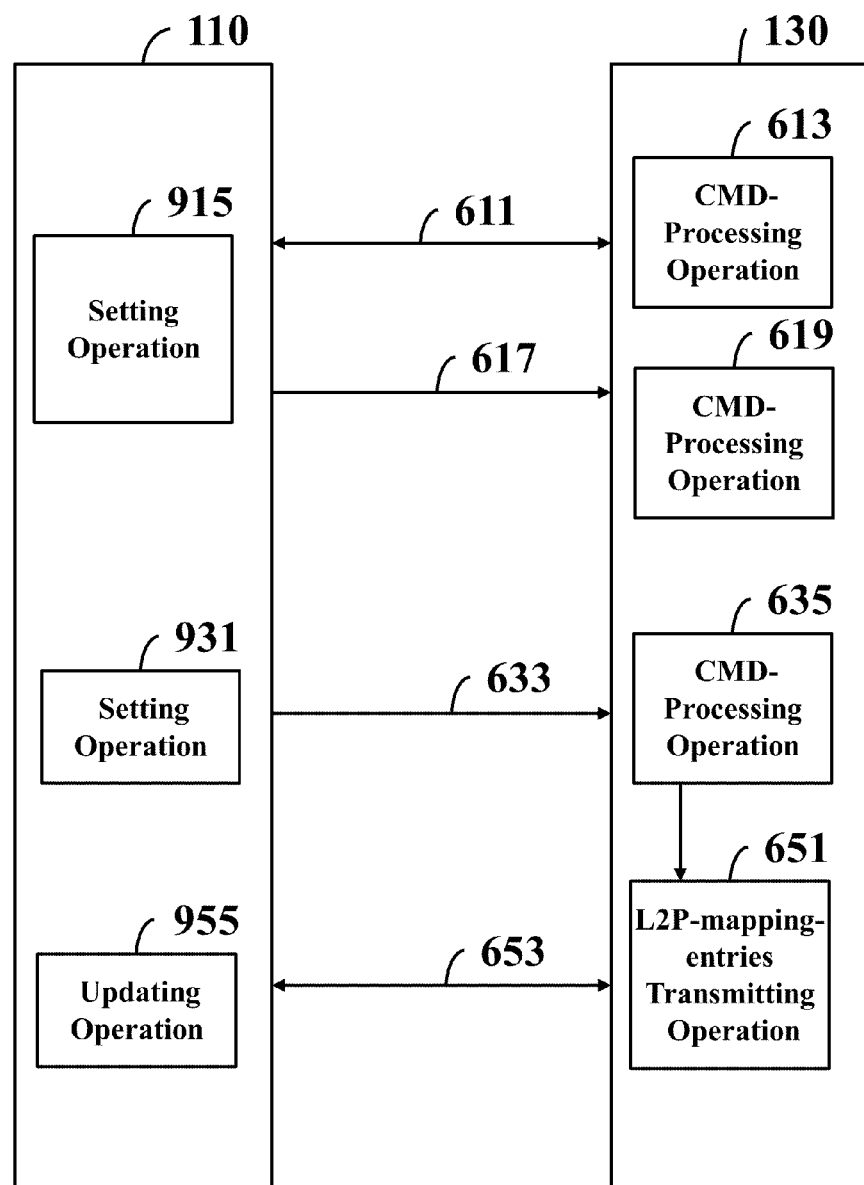
FIG. 9 is a schematic diagram showing an operation sequence for updating the HPA buffer according to an embodiment of the invention.

Refer to FIG. 9 showing the operation sequence for updating the HPA buffer, in which the technical details of the operations 611, 613, 617, 619, 633, 635, 651 and 653 are the same as that as shown in FIG. 6. Details of the other operations are described as follows:

Operation 915: The host side 110 obtains the information indicating that the designated sub-region(s) of the designated region(s) need/needs to update from the values of the Ext_CSD registers (e.g. Ext_CSD[67:64]).

Operation 931: The host side 110 determines the L2P mapping entries of the designated sub-region(s) of the designated region(s) to be obtained from the eMMC storage according to the information obtained from the flash controller 130.

Operation 955: The host side 110 obtains the L2P mapping entry carried in each packet, and updates the corresponding portion(s) of content in the HPA buffer. After updating the L2P mapping entries carried in the last packet completely, the host side 110 issues CMD13 to the flash controller 130, which includes the completion of packed reads.

Figure 10:
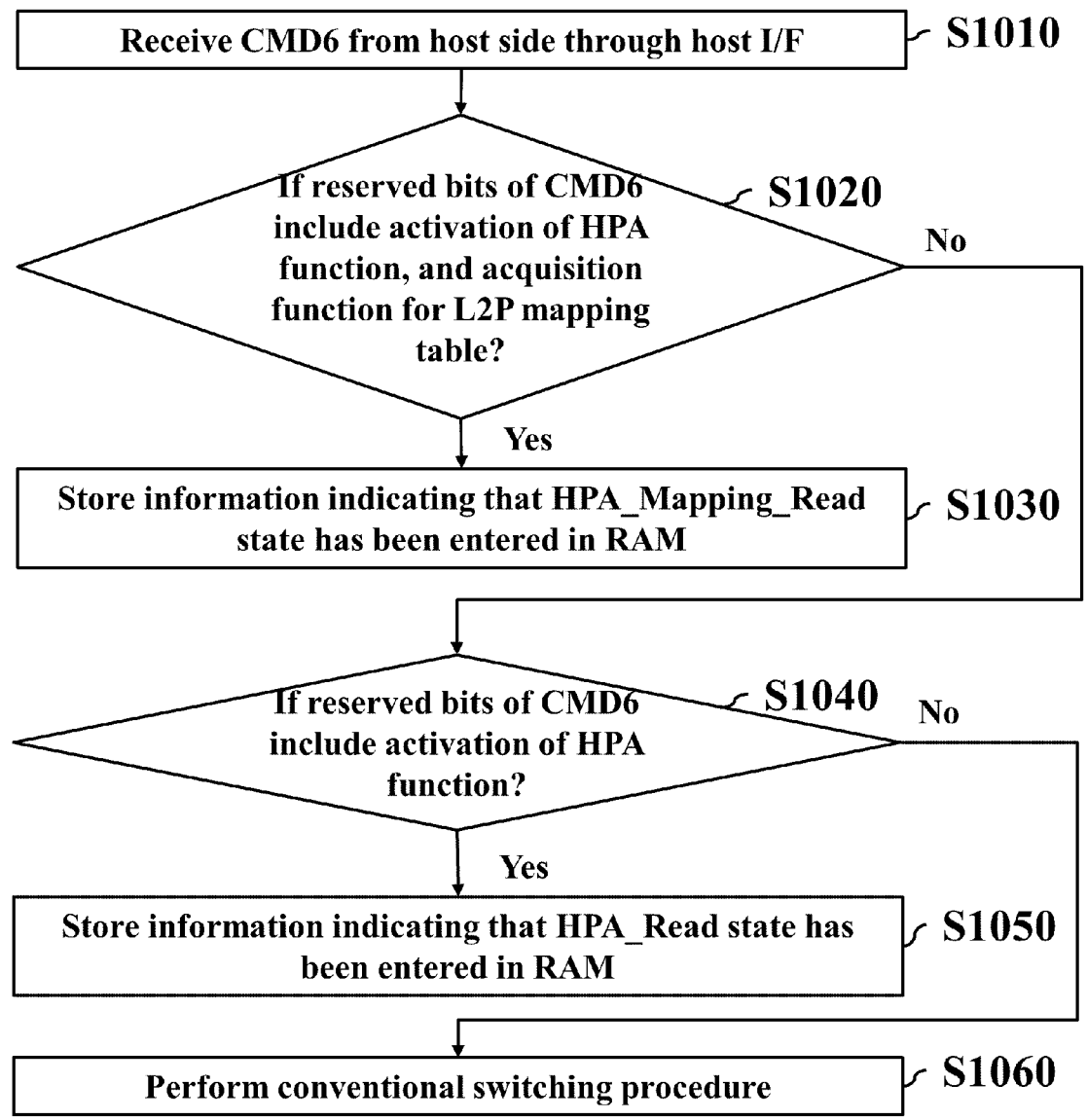
FIG. 10 is a flowchart illustrating a method for executing CMD6 according to an embodiment of the invention.

Refer to FIG. 10 showing a flowchart of the method for executing CMD6 in the CMD-processing operations 619 and 715. The method is performed by the processing unit 134 when loading and executing relevant software or firmware program code, and the detailed steps are described as follows:

Step S1010: CMD6 is received from the host side 110 through the host I/F 131.

Step S1020: It is determined whether the reserved bits of CMD6 includes the information indicating the activation of the HPA function, and the acquisition function for the L2P mapping table. If so, the process proceeds step 51030. Otherwise, the process proceeds step S1040.

Step S1030: Information indicating that the HPA Mapping Read state has been entered is stored in the RAM 136, which will be used as a basis for judging the current device state when CMD25 is received later.

Step S1040: It is determined whether the reserved bits of CMD6 includes the information indicating the activation of the HPA function. If so, the process proceeds step S1050. Otherwise, the process proceeds step S1060.

Step S1050: Information indicating that the HPA Read state has been entered is stored in the RAM 136, which will be used as a basis for judging the current device state when CMD25 is received later.

Step S1060: The conventional switching procedure is performed, such as, switching the operation mode of the device side, modifying the values of Ext_CSD registers, etc.

Figure 11:
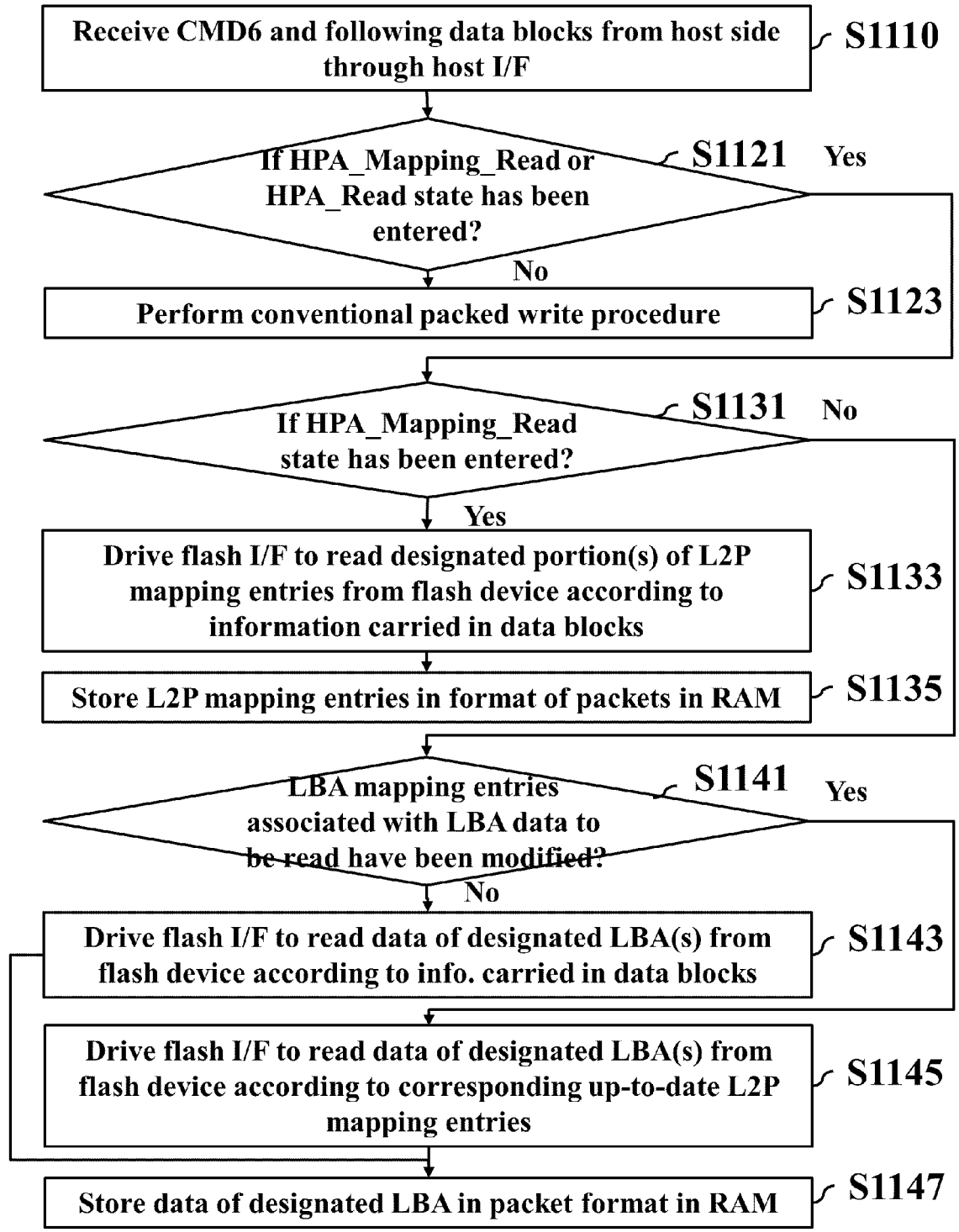
FIG. 11 is a flowchart illustrating a method for executing CMD25 according to an embodiment of the invention.

Refer to FIG. 11 showing a flowchart of the method for executing CMD25 in the CMD-processing operations 635, 735 and 835. The method is performed by the processing unit 134 when loading and executing relevant software or firmware program code, and the detailed steps are described as follows:

Step S1110: CMD25 and the following data blocks are received from the host side 110 through the host I/F 131.

Step S1121: It is determined whether the HPA_Mapping_Read or HPA_Read state has been entered according to the information stored in the RAM 136. If so, the process proceeds to step S1131. Otherwise, the process proceeds to step S1123.

Step S1123: The conventional packed write procedure is performed to drive the flash I/F 139 to program data carried in the packets in the flash device 150.

Step S1131: It is determined whether the HPA_Mapping_Read state has been entered according to the information stored in the RAM 136. If so, the process proceeds to step S1133. Otherwise (that is, the HPA_Read state has been entered), the process proceeds to step S1141.

Step S1133: The flash I/F 139 is driven to read the designated portion(s) of L2P mapping entries of the L2P mapping table from the flash device 150 according to the information carried in the data blocks, that is, the information of the designated sub-region(s) of the designated region(s).

Step S1135: The L2P mapping entries are stored in the RAM 136 in the aforementioned format of packets, which will be transmitted to the host side 110 in the packet format when CMD18 is received later.

Step S1141: It is determined whether the LBA mapping entries associated with the LBA data to be read are modified. If so, the process proceeds to step S1145. Otherwise, the process proceeds to step S1143.

Step S1143: The flash I/F 139 is driven to read data of the designated LBA(s) from the flash device 150 according to the information carried in the data block(s), that is, the information of L2P mapping entries.

Step S1145: The flash I/F 139 is driven to read data of the designated LBA(s) from the flash device 150 according to the corresponding up-to-date L2P mapping entries.

Step S1147: The data of designated LBA(s) is stored in the aforementioned format of packets in the RAM 136, which will be transmitted to the host side 110 in the packet format when CMD18 is received later.

Some or all of the aforementioned embodiments of the method of the invention may be implemented in a computer program such as a driver for a dedicated hardware, a firmware translation layer (FTL) of a storage device, or others. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier such as a DVD, CD-ROM, USB stick, a hard disk, which may be located in a network server accessible via a network such as the Internet, or any other suitable carrier.

Although the embodiment has been described as having specific elements in FIGS. 1 and 2, it should be noted that additional elements may be included to achieve better performance without departing from the spirit of the invention. Each element of FIGS. 1 and 2 is composed of various circuits and arranged operably to perform the aforementioned operations. While the process flows described in FIGS. 10 and 11 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for data reads in a host performance acceleration (HPA) mode, performed by a host side, comprising:
   obtaining a first value of an extended device-specific data (Ext_CSD) register in a flash controller from the flash controller, wherein the host side and the flash controller communicate with each other in an embedded multimedia card (eMMC) protocol; and
   allocating space in a system memory as an HPA buffer, and storing a plurality of first logical-block-address to physical-block-address (L2P) mapping entries obtained from the flash controller when the first value of the Ext_CSD register comprises information indicating that an HPA function is supported, wherein each first L2P mapping entry stores information indicating which physical address that user data of a corresponding logical address is physically stored in a flash device.

2. The method of claim 1, wherein each first L2P mapping entry comprises a logical block address (LBA) and a physical block address (PBA), the LBA is associated with a first length of data, the PBA is associated with a second length of data, and the second length is longer than the first length.

3. The method of claim 2, wherein the first length is 512 bytes.

4. The method of claim 1, comprising:
   searching the HPA buffer for a second L2P mapping entry associated with a logical block address (LBA); and
   issuing a series of commands carrying the second L2P mapping entry to the flash controller for obtaining data of the LBA from the flash controller.

5. The method of claim 4, comprising:
   receiving a normal response command corresponding to one of the series of commands from the flash controller, which indicates that content of the HPA buffer needs to update;
   obtaining a second value of the Ext_CSD register in the flash controller from the flash controller after receiving the normal response command;
   obtaining information indicating a designated portion of content in the HPA buffer needed to update from the second value of the Ext_CSD register;
   obtaining a plurality of third L2P mapping entries in an L2P mapping table, which are needed to update, from the flash controller; and
   updating the designated portion of content in the HPA buffer with the third L2P mapping entries.

6. The method of claim 5, wherein the designated portion needed to update is represented in a region number and a sub-region number, data of continuous LBA range is divided into a plurality of regions, and each region is divided into a plurality of sub-regions.

7. A method for data reads in a host performance acceleration (HPA) mode, performed by a flash controller, comprising:
   setting a reserved bit of an extended device-specific data (Ext_CSD) register in a flash controller to indicate that a storage device supports an HPA function during an initialization of the storage device, thereby enabling a host side to allocate space in a system memory as an HPA buffer according to information of the reserved bit of the Ext_CSD register, and store a plurality of first logical-block-address to physical-block-address (L2P) mapping entries obtained from the flash controller in the HPA buffer,
   wherein each first L2P mapping entry stores information indicating which physical address that user data of a corresponding logical address is physically stored in a flash device, and the host side and the flash controller communicate with each other in an embedded multimedia card (eMMC) protocol.

8. The method of claim 7, wherein the Ext_CSD register comprises a properties segment and a modes segment, the properties segment defines device capabilities and cannot be modified by the host side, and the modes segment defines a configuration that a device is working in and is allowed to be modified by the host side using a switch command.

9. The method of claim 7, comprising:
   receiving a series of commands carrying a second L2P mapping entry from the host side, which request for data of a logical block address (LBA);
   setting a reserved byte of the Ext_CSD register to store information indicating a designated portion of content in the HPA buffer needed to update when detecting that the second L2P entry is invalid; and
   issuing a normal response command corresponding to one of the series of commands to the host side, which indicates that content of the HPA buffer needs to update, for directing the host side to update designated content in the HPA buffer according to information of the reserved byte of the Ext_CSD register.

10. The method of claim 9, wherein the reserved byte of the Ext_CSD register is set to store a region number and a sub-region number, data of continuous LBA range is divided into a plurality of regions, and each region is divided into a plurality of sub-regions.

11. The method of claim 9, wherein the second L2P mapping entry comprises a logical block address (LBA) and a physical block address (PBA), the LBA is associated with a first length of data, the PBA is associated with a second length of data, and the second length is longer than the first length.

12. The method of claim 11, wherein the first length is 512 bytes.

13. An apparatus for data reads in a host performance acceleration (HPA) mode, comprising:
  an extended device-specific data (Ext_CSD) register;
  a host interface (I/F), coupled to a host side; and
  a processing unit, coupled to the Ext_CSD register and the host I/F, arranged operably to set a reserved bit of the Ext_CSD register to indicate that the apparatus supports an HPA function during an initialization of the apparatus, thereby enabling the host side to allocate space in a system memory as an HPA buffer according to information of the reserved bit of the Ext_CSD register, and store a plurality of first logical-block-address to physical-block-address (L2P) mapping entries obtained from the apparatus in the HPA buffer,
  wherein each first L2P mapping entry stores information indicating which physical address that user data of a corresponding logical address is physically stored in a flash device, and the host side and the apparatus communicate with each other in an embedded multi-media card (eMMC) protocol.

14. The apparatus of claim 13, wherein each first L2P mapping entry comprises a logical block address (LBA) and a physical block address (PBA), the LBA is associated with a first length of data, the PBA is associated with a second length of data, and the second length is longer than the first length.

15. The apparatus of claim 14, wherein the first length is 512 bytes.

16. The apparatus of claim 13, wherein the Ext_CSD register comprises a properties segment and a modes segment, the properties segment defines device capabilities and cannot be modified by the host side, and the modes segment defines a configuration that the apparatus is working in and is allowed to be modified by the host side using a switch command.

17. The apparatus of claim 13, wherein the processing unit is arranged operably to receive a series of commands carrying a second L2P mapping entry from the host side, which request for data of a logical block address (LBA); set a reserved byte of the Ext_CSD register to store information indicating a designated portion of content in the HPA buffer needed to update when detecting that the second L2P entry is invalid; and issue a normal response command corresponding to one of the series of commands to the host side, which indicates that content of the HPA buffer needs to update, for directing the host side to update designated content in the HPA buffer according to information of the reserved byte of the Ext_CSD register.

18. The apparatus of claim 17, wherein the reserved byte of the Ext_CSD register is set to store a region number and a sub-region number, data of continuous LBA range is divided into a plurality of regions, and each region is divided into a plurality of sub-regions.

19. The apparatus of claim 17, wherein the second L2P mapping entry comprises a logical block address (LBA) and a physical block address (PBA), the LBA is associated with a first length of data, the PBA is associated with a second length of data, and the second length is longer than the first length.

20. The apparatus of claim 19, wherein the first length is 512 bytes.

* * * * *